United States Patent
Harkare et al.

(10) Patent No.: US 10,486,261 B2
(45) Date of Patent: Nov. 26, 2019

(54) PLASMA SYSTEM WITH INTEGRATED POWER SUPPLY, MOTION CONTROL, GAS CONTROL AND TORCH

(71) Applicant: Lincoln Global, Inc., City of Industry, CA (US)

(72) Inventors: Sriram Harkare, Charleston, SC (US); Christopher Williams, Newcastle (GB)

(73) Assignee: LINCOLN GLOBAL, INC., City of Industry, CA (US)

( * ) Notice: Subject to any disclaimer, the term of this patent is extended or adjusted under 35 U.S.C. 154(b) by 742 days.

(21) Appl. No.: 14/664,287

(22) Filed: Mar. 20, 2015

(65) Prior Publication Data
US 2015/0273618 A1    Oct. 1, 2015

Related U.S. Application Data

(60) Provisional application No. 61/971,762, filed on Mar. 28, 2014.

(51) Int. Cl.
| | | |
|---|---|---|
| *B23K 10/00* | (2006.01) | |
| *B23K 37/00* | (2006.01) | |
| *B23K 37/02* | (2006.01) | |
| *B23K 37/04* | (2006.01) | |

(52) U.S. Cl.
CPC ............ *B23K 10/006* (2013.01); *B23K 10/00* (2013.01); *B23K 37/0235* (2013.01); *B23K 37/0461* (2013.01)

(58) Field of Classification Search
CPC .. B23K 10/00; B23K 10/006; B23K 37/0235; B23K 37/0461

USPC ............ 219/121.31, 121.39, 121.54, 121.55, 219/121.56; 700/159, 166, 169
See application file for complete search history.

(56) References Cited

U.S. PATENT DOCUMENTS

| | | | |
|---|---|---|---|
| 3,787,247 A | * | 1/1974 | Couch, Jr. .............. B23K 10/00 148/197 |
| 5,866,872 A | | 2/1999 | Lu et al. |
| 6,359,251 B1 | | 3/2002 | Picard et al. |
| | | | (Continued) |

FOREIGN PATENT DOCUMENTS

JP     H05245647 A     9/1993

OTHER PUBLICATIONS

Japanese to English machine translation of JPH05245647.*
(Continued)

*Primary Examiner* — Michael G Hoang

(57) ABSTRACT

An integrated plasma cutting system includes a plasma cutting power supply and a motion control device to move a torch along a desired cut path relative to a workpiece. The system also includes a torch height control device to adjust a gap between a tip of the torch and the workpiece and a gas control device to regulate a gas used in the integrated plasma cutting system. The system further includes a centralized controller that includes an integrated microprocessor architecture that controls a sequence of the plasma arc, controls the regulation of the gas used in the integrated plasma cutting system gases, and controls coordination of the movement of the torch along the cut path with adjusting the gap without aid of an intervening microprocessor architecture in any one of the plasma cutting power supply, the motion control device, the torch height control device and the gas control device.

20 Claims, 3 Drawing Sheets

(56) References Cited

U.S. PATENT DOCUMENTS

| | | |
|---|---|---|
| 6,365,868 B1 | 4/2002 | Borowy et al. |
| 6,772,040 B1 | 8/2004 | Picard et al. |
| 6,900,408 B2 | 5/2005 | Picard et al. |
| 2003/0204283 A1 | 10/2003 | Picard et al. |
| 2009/0134995 A1* | 5/2009 | Wardlaw, III ........ B23K 37/006 340/532 |
| 2010/0155377 A1 | 6/2010 | Lindsay et al. |
| 2012/0199566 A1* | 8/2012 | Hillen .................... B23K 9/095 219/130.1 |
| 2012/0298632 A1 | 11/2012 | Riemann et al. |
| 2013/0043220 A1 | 2/2013 | Henderson et al. |
| 2013/0264317 A1 | 10/2013 | Hoffa et al. |
| 2014/0046477 A1 | 2/2014 | Brahan et al. |

OTHER PUBLICATIONS

Japanese to English machine translation of JPH05245647, published in 1993.*

International Application No. PCT/IB2015/000406, International Search Report & Written Opinion, 11 pages, dated Sep. 8, 2015.

\* cited by examiner

PLASMA SYSTEM WITH INTEGRATED POWER SUPPLY, MOTION CONTROL, GAS CONTROL AND TORCH

INCORPORATION BY REFERENCE

The present application claims priority to Provisional Application 61/971,762, filed Mar. 28, 2014, which is incorporated herein by reference in its entirety.

TECHNICAL FIELD

Devices, systems, and methods consistent with the invention relate to cutting, and more specifically to devices, systems and methods for plasma cutting operations.

BACKGROUND

Currently, in an automated plasma cutting application the plasma power supply, motion and process controller, torch height control and gas control are separate pieces of equipment that are interconnected using cables to create a system used for controlling the plasma cutting process. Each individual component of this system has its own electronics and software/firmware executed by a microprocessor. This decentralized approach increases the system cost and installation time and complexity. Additionally, the interconnects between the components of such a system can also lead to significant limitations in system performance.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is complete, integrated plasma cutting system having each of the plasma cutting power supply, motion and process controller, torch height control, gas control and user interface integrated into a single unit. The system will use a centralized microprocessor architecture which will control and sequence the plasma arc, regulate the gases and gas flows (rates and pressures), provide coordinated motion control of multiple axes along with controlling multiple height control system for plasma torches. In other exemplary embodiments, the user interface can be positioned remote from the remainder of the components to provide added user flexibility. Such a system will provide for improved system level process control, and the centralized microprocessor architecture will allow for packaging all of the system components within a single enclosure. This will minimize the number of separate components needed and optimize system performance, while at the same time increasing system reliability. Additionally embodiments of the present invention will minimize the number of interconnect cables and improve the overall system performance.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
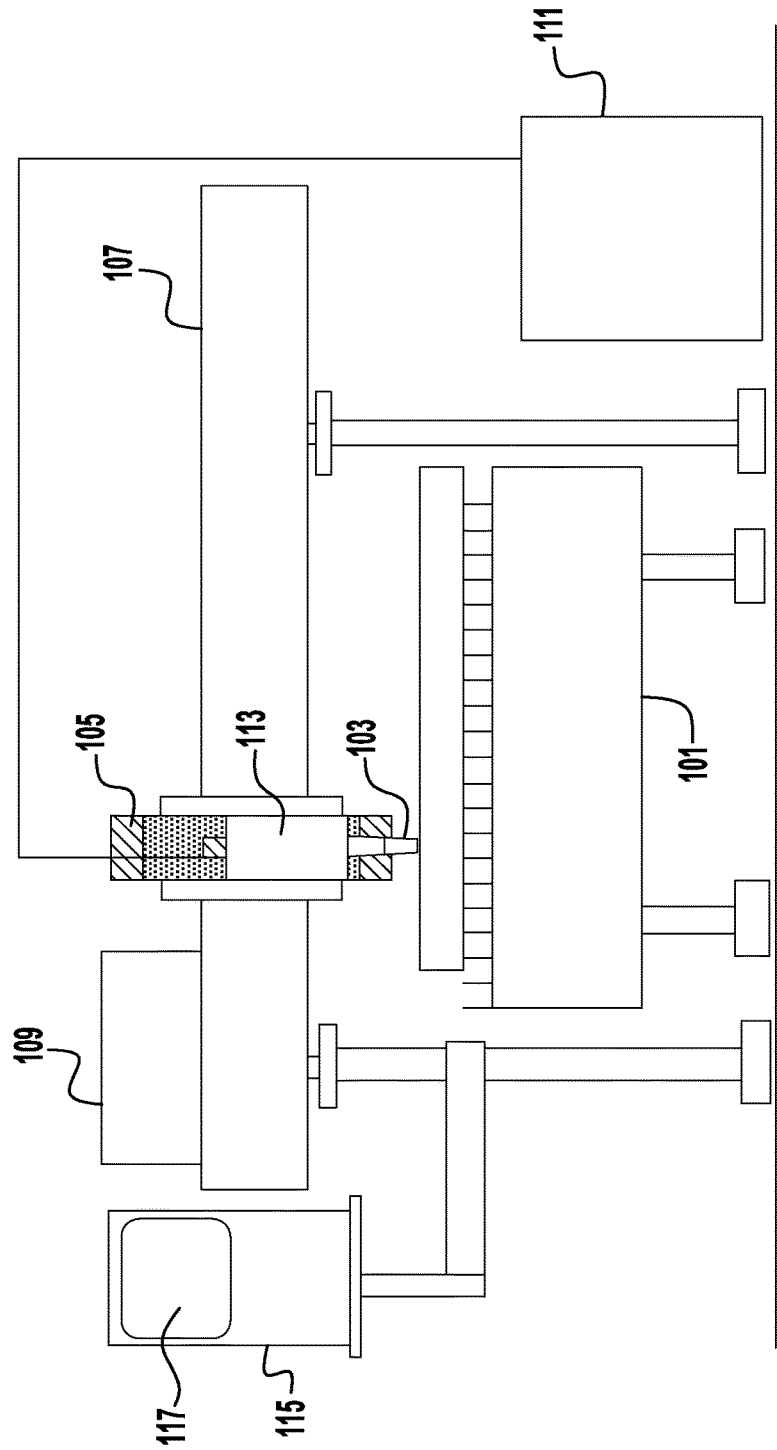
FIG. 1 is a diagrammatical representation of a known plasma cutting system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Embodiments of the present invention can be used for cutting various shapes and cutouts in many different materials, and is not limited to any particular cutting processes.

Turning now to FIG. 1, an known plasma cutting system 100 is depicted. The plasma torch system 100 includes a cutting table 101 and plasma torch 103. The construction and operation of cutting tables and plasma torches are well known by those of skill in the art and will not be discussed in detail herein. The system 100 can also use a torch height controller 105 which can be mounted to a gantry system 107. The system 100 can also include a drive system 109 which is used to provide motion to the torch 103 relative to a workpiece positioned in the table 101. A plasma cutting power supply 111 is coupled to the torch 103 to provide the desired current used to create the cutting plasma. The system 100 can also include a gas console 113 that can be used to regulate gas flow rates and pressures used for both the plasma and shield gas during the cutting operation. The console 113 can also be used to select different gases depending in the cutting operation that is being performed. That is, certain gases may be used for some cutting operations, but would not be used for others. The torch system 100 also includes a computer numeric controller (CNC) 115, which can include a user input/display screen 117. The screen 117 and CNC 115 are used by the user to input and read cutting operational parameters and data, and allow the system 100 to be used as an automated, programmable cutting system. Various input parameters can be input by a user into the CNC, via the screen 117 (or other means) including: torch current, material type, material thickness, cutting speed, torch height, plasma and shield gas composition, etc. As stated above, the plasma system 100 can have many different configurations, and embodiments are not limited to that shown in FIG. 1, which is intended to be exemplary. However, each of the power supply 111, console 113, drive system 109, torch height controller 105, and CNC have separate and distinct controllers which control their respective operations. For example, the CNC 115 controller communicates with the power supply 111 controller and provides operational parameters to the power supply 111 controller, but then the power supply controller controls the discrete operation of the power supply. This functionality and relationship is true for all of the other components and can cause the issues generally described above, which are obviated by embodiments of the present invention.

Figure 2:
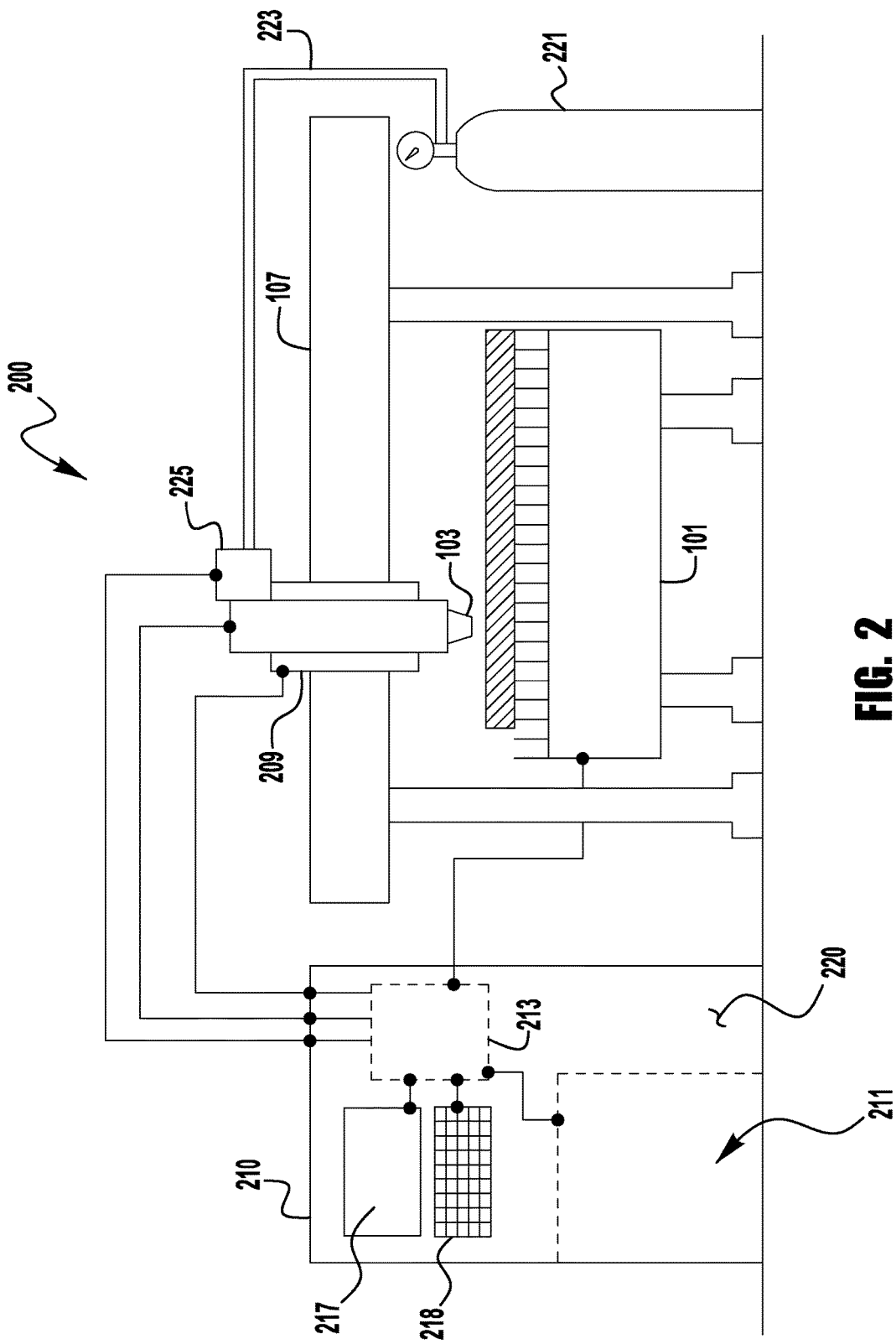
FIG. 2 is a diagrammatical representation of an exemplary embodiment of a plasma cutting system in accordance with an embodiment of the present invention.

FIG. 2 depicts an exemplary embodiment of the present invention, where the plasma cutting system 200 utilizes an integrated plasma cutting system 210. Specifically, unlike prior systems, the system 210 contains the power supply electronics module 211 which is used to generate the cutting signal that is sent to the torch 103. That is, all of the power electronics which are used to generate the cutting current signal are located within the same housing 220 as the system controller 213. The system controller 213 controls all aspects of the cutting operation. As shown, the controller 213 communicates with the power generation components of the power supply module 211 internal to the housing 220. Further, the controller 213 also directly controls the gas flow by directly communicating with a gas flow control device 225 which controls the flow of gas from the gas supply 221 through the gas line 223 to the flow control device 225. Additionally, the controller 213 directly communicates with the motion control device 209 and controls the operation of the motion control device 209 on the gantry system 107. In addition to controlling the movement along the gantry 107 the controller 213 also controls the height of the torch 103 during operation of the system 200, and/or the angling of the torch 103 for any desired bevel cutting. Further, to the extent the table 101 has any automated or motion functions, the controller 213 can be coupled to the table 101 to control the table's operations. For example, if the table is a water table or can move the workpiece, the controller 213 will control this operation. Further, in exemplary embodiments, the controller 213 can control multiple torches operating at the same time.

As shown, the integrated system 210 has a user input screen 217 and/or a user input device 218 (like a keyboard) to allow for the user to input and review various operational parameters and characteristics. It should also be noted that in some applications a second user input device can be positioned remote from the overall system to allow a user to control/operate the system remotely. Such a user input device can be any type of device, such as a remote pendant, which allows for control of the system, and can have any known user input means, such as a touch screen, or the like. The remote user input device (not shown) can be any type of iOS or Android based device, or use any type of known or proprietary operating system to control the operation of the system as described herein. The secondary user input device can communicate with the system via any known wired or wireless method or protocol. In further exemplary embodiments, there will be no user interface or input screen on the system 210, but a remote user interface device or system. In such a system the user interface device would have a separate microcontroller to control the operation of the user interface device, which can be a computer, pendant, or other remote device capable of communicating user input information to the system 210.

The use of such a system eliminates the need for separate control systems to control the operation of the power supply module 211, gas flow, motion control and/or the torch. That is, the single controller 213 controls all of these operations as a single controller module. This centralized microprocessor architecture allows for the packaging of the power supply module 211, the torch height control system, motion and process control, and gas control to be on one controller operating by a single microprocessor system. This eliminates the need to have multiple, discrete microprocessing control systems communicating and interacting with each other—which can cause communication issues or otherwise prevent optimal system functionality. For example, the use of the system 210 (which is all within a single housing) prevents the need for a stand-alone system controller (e.g., 115) to communicate with separate and distinct (and remotely located) controllers for all of the discrete system operations.

As is generally understood by those of ordinary skill in the art, the controller 213 can be any type of computer system that controls the overall operation of the system 210 (which then controls the overall operation of the system 200). As is general known, a controller 213 has a processor, electronic storage device, and an interface for providing control instructions to a plasma arc torch system 210. The storage or memory device can be internal or external and can contain data relating to the part to be cut in the workpiece. In other embodiments, the controller 213 can be manually programmed, and in some embodiments the controller 213 can include a computer readable product that includes computer readable instructions that can select or configure operating parameters of the plasma torch system. In further exemplary embodiments the computer readable instructions can be cut charts, nesting software, or CAD programs. Such instructions typically include cutting information including instructions for the system 210 when cutting various holes, contours, shapes, etc., taking into account the sizes and shapes of the holes/contours and the material being cut. As is generally understood the controller 213 can allow a user to cut numerous successive holes, contours, shapes or a combination of holes, contours shapes in a workpiece. For example, the operator can select a cutting program that includes both hole and contour cutting instructions, and the controller 213 will determine the order and positioning of the cuts, as well as the various parameters of the cuts based on the user input information.

The user interface/screen 217 (and/or input device 218) coupled to a controller 213 illustrates one possible hardware configuration to support the systems and methods described herein, that is being the controller for the system 210. Of course, similar controller type systems can be used to control and/or operate the systems described herein. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The controller 213 of the system 210 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The controller 213 can further include a hard disk drive, a magnetic disk drive, e.g., to read from or write to a removable disk, and an optical disk drive, e.g., for reading a CD-ROM disk or to read from or write to other optical media. The controller can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by a user interface coupled to the controller.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface can be any of a number of commercially available operating systems, or can use a proprietary operating system.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with a user interface coupled to the controller 195 to present data that is electronically received from the processing unit. For example, the display can be a liquid crystal display (LCD), plasma display, cathode-ray tube (CRT) type display, light-emitting diode (LED) type display, or another type of monitor or display that presents data electronically. Alternatively or in addition, the display can present received data in a hard copy format such as a printer, facsimile, plotter, etc. The display can present data in any color and can receive data from a user interface via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 3:
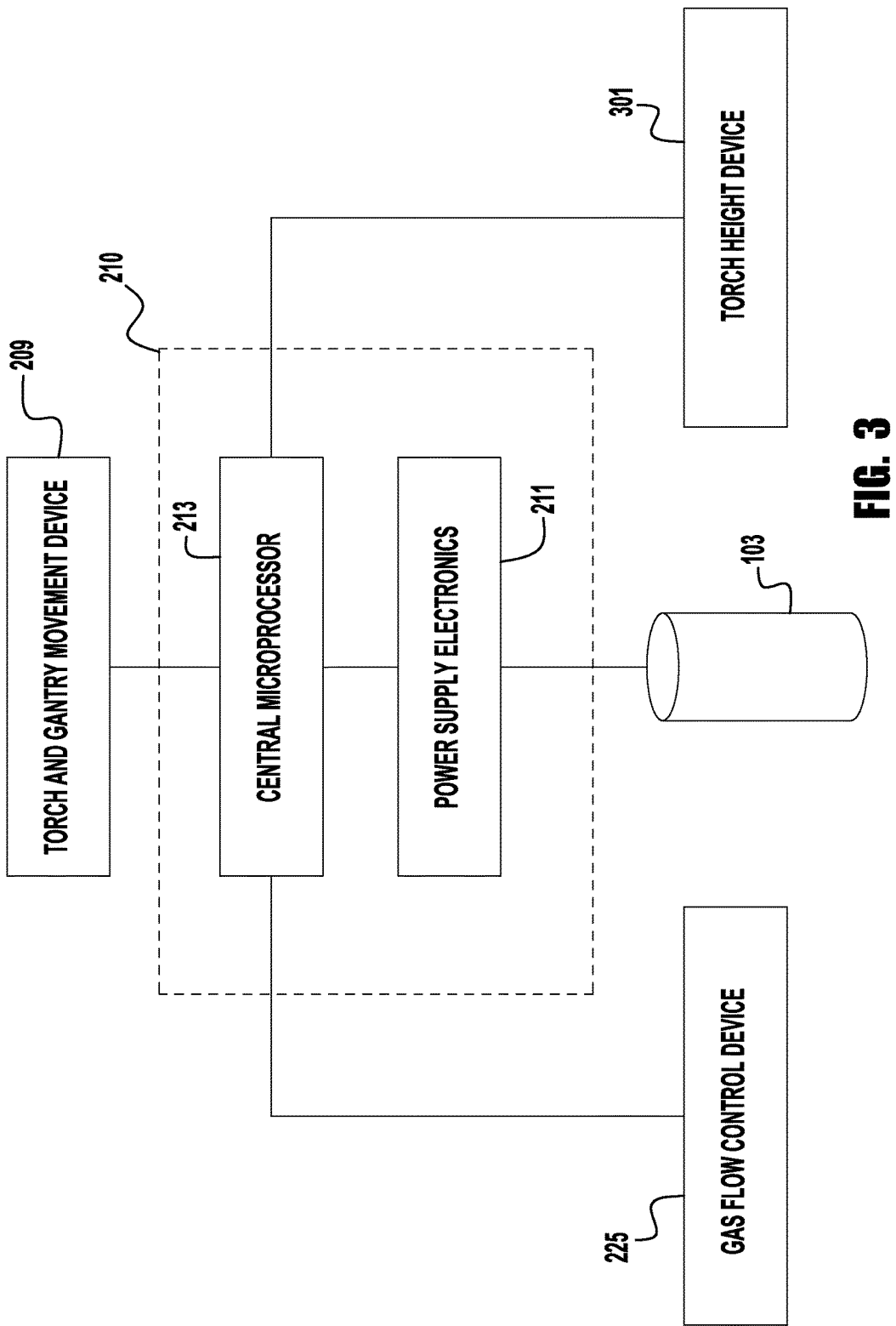
FIG. 3 is a diagrammatical representation of a communication tree of an exemplary embodiment of the present invention.

FIG. 3, depicts diagrammatical representation of the control/communication of systems of the present invention. As shown, the central microprocessor 213 controls the operation of each of the power supply electronics 211, torch and gantry movement device 209, torch height device 301 and gas flow control device 225. Of course, it should be understood that embodiments of the present invention do not eliminate all electronics from the peripheral devices (e.g., 209, 301, 225), as these devices will still have electronic devices like motors, servos, and simple control electronics. However, the central microprocessor 213 does provide all of the control and operational signals for all of the peripheral devices and the power supply electronics, and controls the operation of these components. That is, there is no intervening microprocessing controller which acts as an intermediate controller between the controller 213 and the various movement or operating components of the peripheral devices. It should be noted that in some exemplary embodiments, the user interface can have its own microprocessor, separate from the system microprocessor controlling operation of the cutting components.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include other embodiments.

What is claimed is:

1. An integrated plasma cutting system, the system comprising:
   a plasma cutting power supply to provide a desired current to at least one torch to create a plasma arc to cut a workpiece;
   a motion control device to move the at least one torch along a desired cut path relative to the workpiece;
   a torch height control device to adjust a gap between a tip of the at least one torch and the workpiece;
   a gas control device to regulate at least one of a gas selection, a gas flow rate and a gas pressure of at least one gas used in the integrated plasma cutting system; and
   a centralized controller to control each of the plasma cutting power supply, the motion control device, the torch height control device and the gas control device,
   wherein the centralized controller includes an integrated microprocessor architecture that controls sequences of the respective plasma arcs, controls the regulation of the at least one gas used in the integrated plasma cutting system, determines an order and positioning of cuts based on user input information, and controls coordination of movement of the at least one torch along the cut path with adjusting the gap between the tip of the at least one torch and the workpiece, without aid of an intervening microprocessor architecture in any one of the plasma cutting power supply, the motion control device, the torch height control device and the gas control device.

2. The integrated plasma cutting system of claim 1, further comprising:
   a user interface that allows a user to interact with the integrated plasma cutting system.

3. The integrated plasma cutting system of claim 2, wherein the user interface includes a microprocessor that is separate from the integrated microprocessor architecture, and
   wherein the user interface is positioned remotely from at least one of the plasma cutting power supply, the motion control device, the torch height control device and the gas control device.

4. The integrated plasma cutting system of claim 2, wherein the centralized controller operates the user interface without aid of an intervening microprocessor architecture in the user interface to process commands input from the user and present data to the user via a display.

5. The integrated plasma cutting system of claim 4, wherein the display is one of a liquid crystal display, a plasma display, a cathode-ray tube type display, and a light-emitting diode (LED) type display.

6. The integrated plasma cutting system of claim 2, wherein the plasma cutting power supply, the motion control device, the torch height control device, the gas control device, and the user interface are disposed within a single enclosure.

7. The integrated plasma cutting system of claim 4, wherein the user inputs at least one of torch current, material type, material thickness, cutting speed, torch height, and plasma and shield gas composition into the user interface prior to start of cutting operations.

8. The integrated plasma cutting system of claim 1, wherein the integrated microprocessor architecture includes a single microprocessor to control the plasma cutting power supply, the motion control device, the torch height control device and the gas control device.

9. The integrated plasma cutting system of claim 1, wherein the integrated microprocessor architecture includes a computer with a multi-processor architecture to control the plasma cutting power supply, the motion control device, the torch height control device and the gas control device.

10. The integrated plasma cutting system of claim 1, wherein the regulation of the at least one gas used in the integrated plasma cutting system includes regulating at least one of a plasma gas and a shield gas.

11. The integrated plasma cutting system of claim 1, further comprising:
    a gantry disposed over the workpiece and supporting the at least one torch,
    wherein the centralized controller controls movement of the at least one torch along the gantry.

12. The integrated plasma cutting system of claim 1, wherein the coordination of the movement of the at least one torch further includes controlling an angle of the at least one torch relative to the workpiece to create respective bevel cuts.

13. The integrated plasma cutting system of claim 1, wherein the workpiece is disposed on a water table, and
    wherein the centralized controller controls operation of the water table.

14. The integrated plasma cutting system of claim 1, wherein the workpiece is disposed on a movable table, and
    wherein the centralized controller controls operation of the movable table.

15. The integrated plasma cutting system of claim 1, wherein the centralized controller controls coordination of a movement of a second torch along a second cut path with adjusting a second gap between a tip of the second torch and the workpiece.

16. The integrated plasma cutting system of claim 1, wherein the centralized controller includes a storage device that contains data related to a part to be cut in the workpiece.

17. The integrated plasma cutting system of claim 1, wherein the centralized controller includes a non-transitory computer readable product that includes computer readable instructions, and
    wherein the computer readable instructions perform at least one of select and configure operating parameters of the integrated plasma cutting system.

18. The integrated plasma cutting system of claim 17, wherein the computer readable instructions are at least one of cut charts, nesting software, and CAD programs.

19. The integrated plasma cutting system of claim 18, wherein the computer readable instructions include cutting information for cutting at least one of holes, contours, and shapes.

20. The integrated plasma cutting system of claim 19, wherein the cutting information further includes information of a type of material being cut.

* * * * *